United States Patent
Thomas et al.

(10) Patent No.: US 10,195,925 B2
(45) Date of Patent: Feb. 5, 2019

(54) VEHICLE DOOR ASSEMBLY INCLUDING STORAGE BIN THAT IS TRANSLATABLE IN FORE-AFT DIRECTION

(71) Applicant: GM Global Technology Operations LLC, Detroit, MI (US)

(72) Inventors: Scott D. Thomas, Novi, MI (US); Ronald J. Mesic, Jr., Warren, MI (US); Sital K. Shah, Troy, MI (US); Jonathan Kline, Waterford, MI (US); Joseph Bilderbeck, Rochester Hills, MI (US); Stanley Roc, Warren, MI (US); Toure D. Lee, Pontiac, MI (US); Sara Rahimian, West Bloomfield, MI (US); Wendi Rea, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 80 days.

(21) Appl. No.: 15/428,605

(22) Filed: Feb. 9, 2017

(65) Prior Publication Data
US 2018/0222293 A1    Aug. 9, 2018

(51) Int. Cl.
| | |
|---|---|
| *B60J 5/04* | (2006.01) |
| *E05B 83/28* | (2014.01) |
| *B60R 7/04* | (2006.01) |
| *E06B 7/28* | (2006.01) |
| *B60N 3/10* | (2006.01) |

(52) U.S. Cl.
CPC ............ *B60J 5/0413* (2013.01); *B60J 5/0416* (2013.01); *B60R 7/046* (2013.01); *E05B 83/28* (2013.01); *B60N 3/10* (2013.01); *E06B 7/28* (2013.01)

(58) Field of Classification Search
CPC ........ B60J 5/0413; B60J 5/0416; B60R 7/046
USPC .............................................. 296/146.7, 37.13
See application file for complete search history.

(56) References Cited

U.S. PATENT DOCUMENTS

| | | | |
|---|---|---|---|
| 6,199,942 B1 | 3/2001 | Carroll, III et al. | |
| 6,247,745 B1 | 6/2001 | Carroll, III et al. | |
| 9,238,440 B1 * | 1/2016 | Bowser | ................... B60R 7/084 |
| 2007/0194582 A1 * | 8/2007 | Arbaugh | ................... B60R 7/04 |
| | | | 296/24.34 |
| 2010/0201108 A1 * | 8/2010 | Iwayama | ................ B60R 7/046 |
| | | | 280/730.2 |
| 2016/0280129 A1 * | 9/2016 | Newbound | ......... B60R 13/0237 |
| 2018/0154744 A1 * | 6/2018 | Hashiguchi | ............ B60J 5/0413 |

FOREIGN PATENT DOCUMENTS

DE            10033375 C1 *   2/2002

OTHER PUBLICATIONS

Machine Translation of DE10033375, printed from the EPO website, Jun. 22, 2018.*

* cited by examiner

*Primary Examiner* — Jason S Morrow

(57) ABSTRACT

A vehicle door assembly according to the present disclosure includes a door inner structure and a storage bin. The door inner structure includes an outer side panel and an armrest. The armrest projects laterally inward from the outer side panel. The storage bin is disposed below the armrest, attached to the door inner structure, and translatable relative to the door inner structure between a rearward position and a forward position.

15 Claims, 14 Drawing Sheets

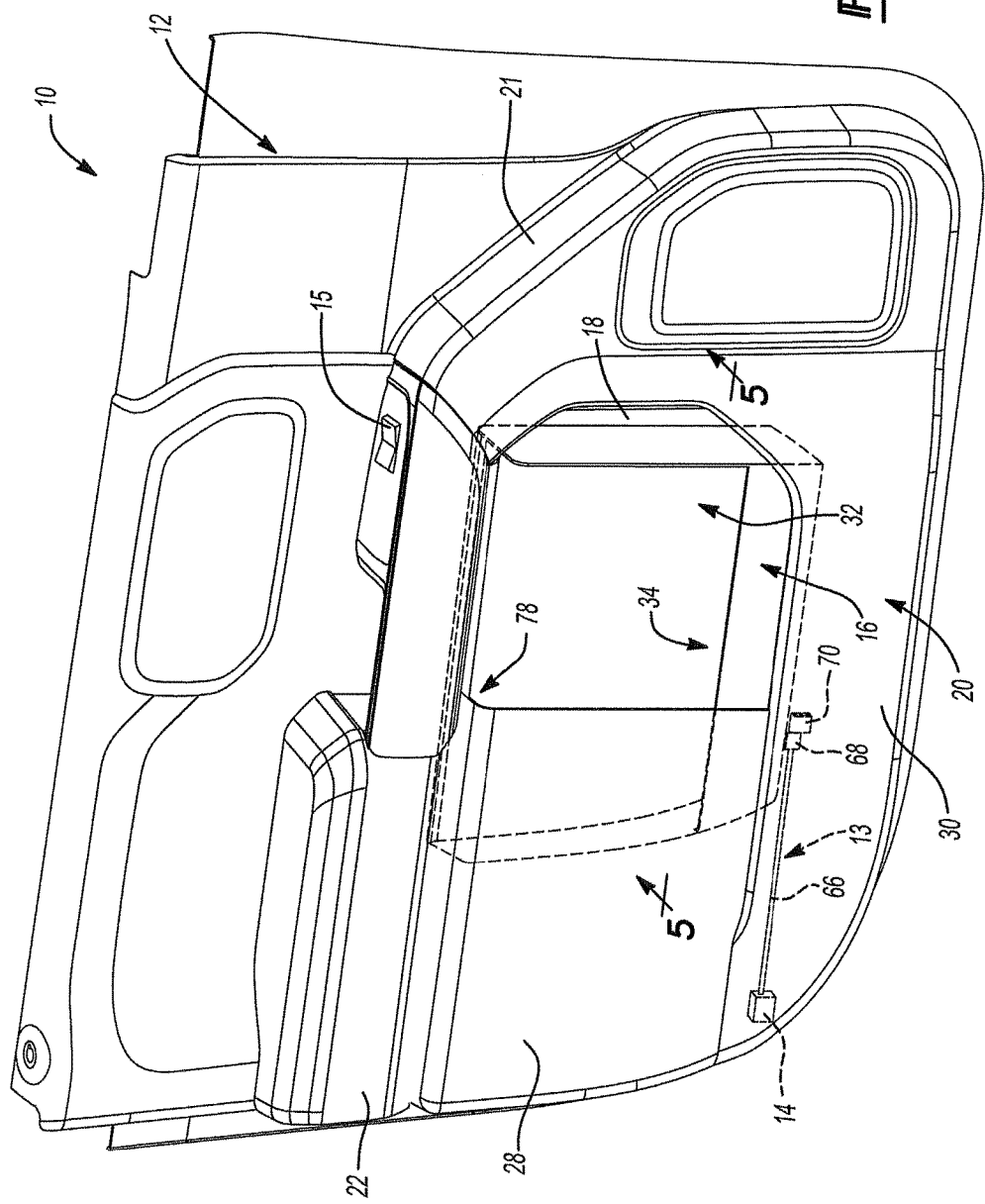

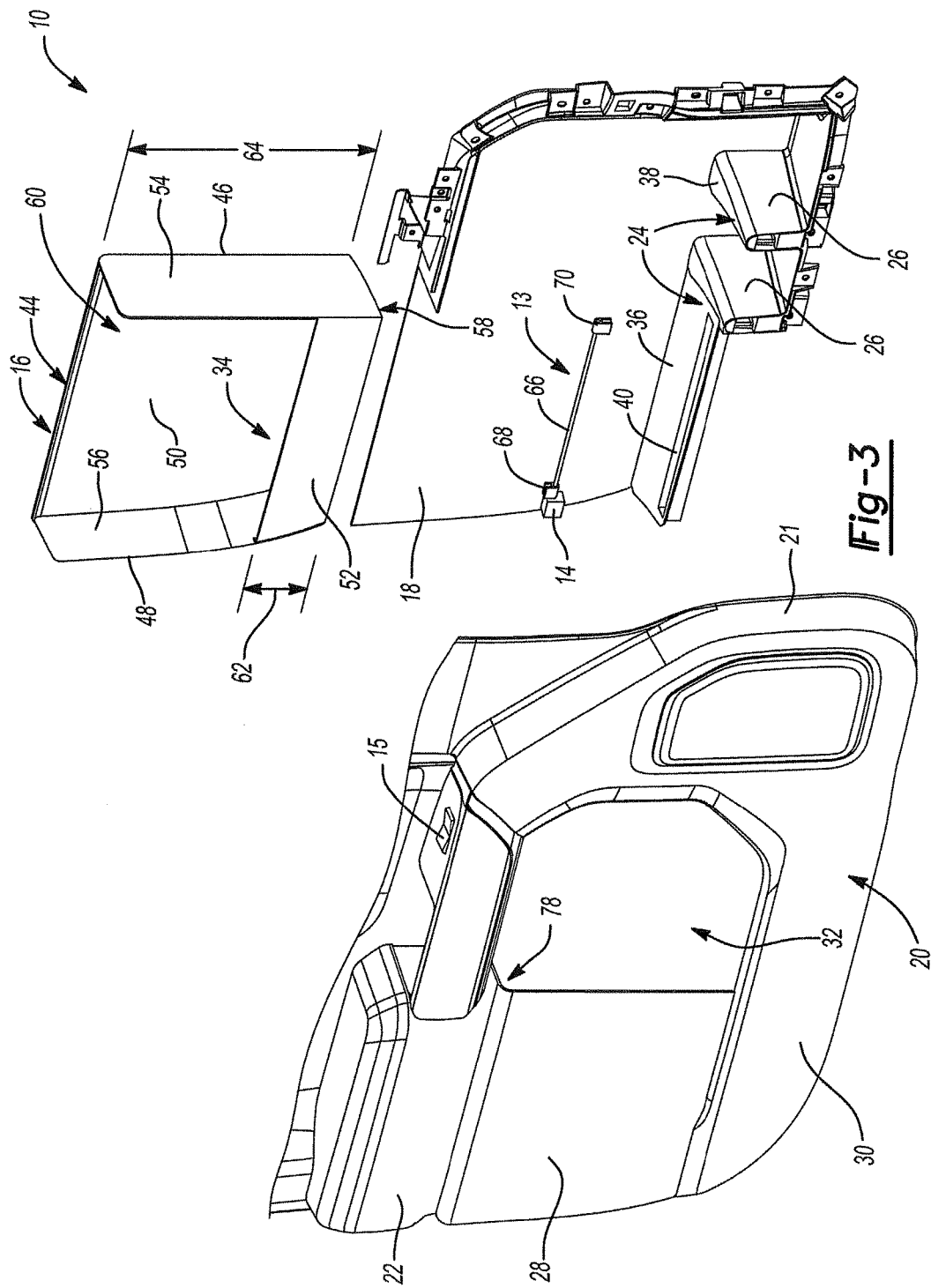

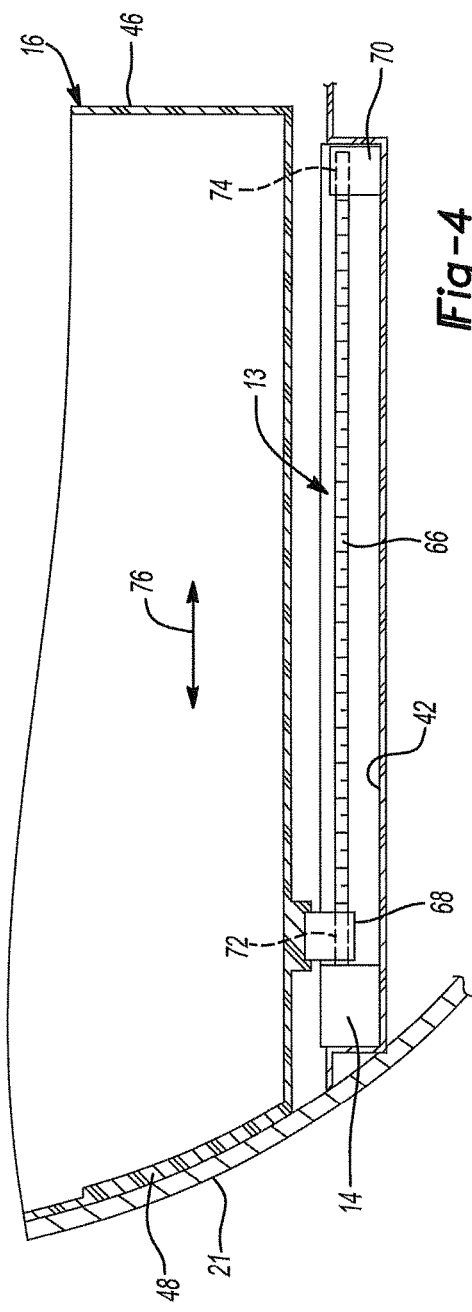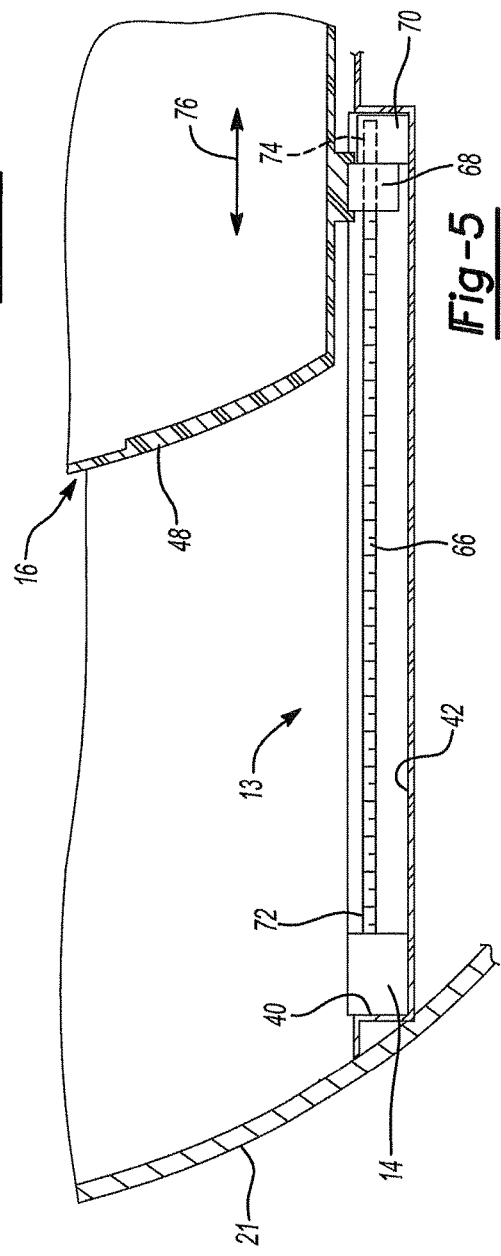

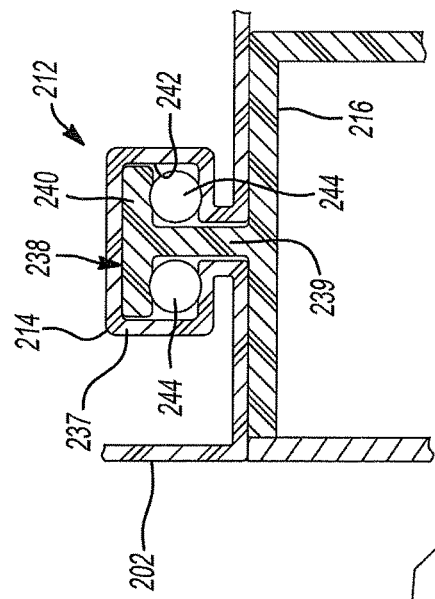
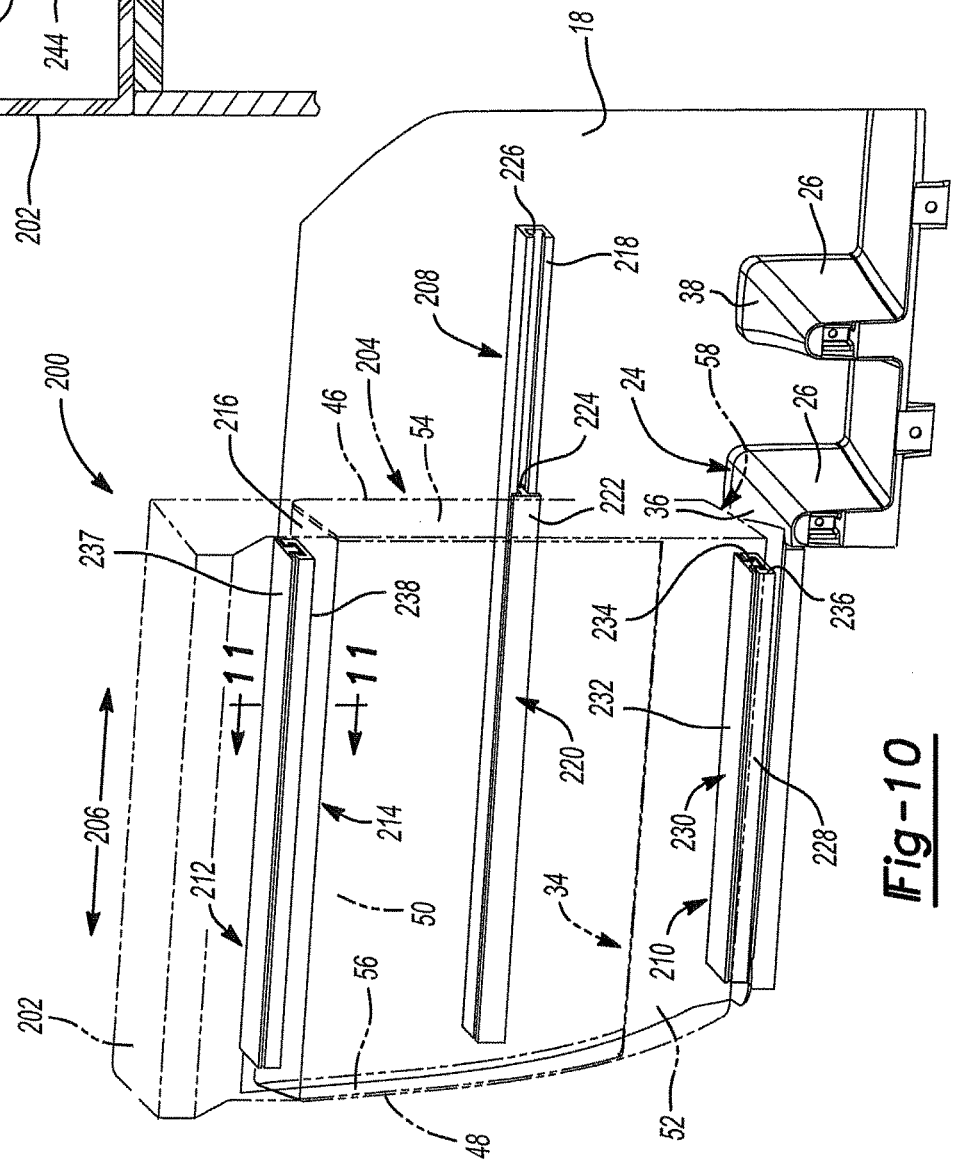

VEHICLE DOOR ASSEMBLY INCLUDING STORAGE BIN THAT IS TRANSLATABLE IN FORE-AFT DIRECTION

FIELD

The present disclosure relates to a vehicle door assembly including a storage bin that is translatable in the fore-aft direction.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A door assembly of a vehicle typically includes a door outer structure disposed on the exterior of the vehicle and a door inner structure disposed in the interior of the vehicle. The door outer structure is typically made of sheet metal, and the door inner structure is typically made of plastic. Various components are often mounted to the door inner structure. Examples of these components include a handle, a switch panel for window switches and/or lock switches, a window opening and closing mechanism, and/or speakers.

The door inner structure typically includes an armrest, storage compartments for items such as an umbrella, and cup holders. The storage compartments and the cup holders are often integrally formed with the remainder of the door inner structure using, for example, injection molding. Thus, the storage compartments and the cup holders are typically fixed to the remainder of the door inner structure. In addition, the items placed in the storage compartments or the cup holders are in plain sight of anyone near the vehicle. Thus, the storage compartments and the cup holders are not ideal for storing valuable or fragile items. While some storage compartments have covers or lids, accessing the interior space of these storage compartments is not easy since it involves opening the lids. In addition, the interior spaces and access openings of these storage compartments are relatively small and may be located in regions that are not ergonomically easy to access.

SUMMARY

A vehicle door assembly according to the present disclosure includes a door inner structure and a storage bin. The door inner structure includes an outer side panel and an armrest. The armrest projects laterally inward from the outer side panel. The storage bin is disposed below the armrest, attached to the door inner structure, and translatable relative to the door inner structure between a rearward position and a forward position.

Another vehicle door assembly according to the present disclosure includes a door inner structure, at least one track, a storage bin, and a latch. The at least one track includes a guide rail that is fixed to the door inner structure and a slide that is slidable in the guide rail. The storage bin is attached to the slide of the at least one track and is translatable relative to the door inner structure between a rearward position and a forward position. The latch retains the storage bin in the rearward position and is releasable to move the storage bin to the forward position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a perspective view of the door assembly of FIG. 1 with the storage bin in the forward position;

FIG. 3 is an exploded perspective view of the door assembly of FIG. 1;

FIG. 4 is a section view of a portion of the door assembly of FIG. 1 with the storage bin in the rearward position;

FIG. 5 is a section view of a portion of the door assembly of FIG. 1 with the storage bin in the forward position;

FIG. 10 is a perspective view of a third door assembly according to the principles of the present disclosure, the fourth door assembly including multiple tracks, a storage bin shown in a rearward position, and discontinuous support shelf;

FIG. 11 is a section view of the track of the third door assembly;

In the drawings, reference numbers may be reused to identify similar and/or identical elements.

DETAILED DESCRIPTION

A vehicle door assembly according to the present disclosure includes a door inner structure and a storage bin that is translatable relative to the door inner structure between a rearward position and a forward position. When the storage bin is in the rearward position, an interior compartment of the storage bin is hidden by an inner side panel of the door inner structure. When the storage bin is in the forward position, the interior compartment of the storage bin is accessible. Thus, a vehicle occupant may store valuable items in the storage bin.

In one example, the storage bin is mounted to a track attached to the door inner structure, and a motor is operable to translate the storage bin between the rearward position and the forward position. The motor is only operable to translate the storage bin when an ignition switch of the vehicle is in an ON position. Thus, items stored in the storage bin are securely locked in the storage bin and hidden from view when the storage bin is in the rearward position and the ignition switch is in an OFF position.

In another example, the storage bin is manually translated on the track between the rearward position and the forward position using a handle on the storage bin. The storage bin is lockable in the rearward position using an automatic or manual lock. Thus, items stored in the storage bin are securely locked in the storage bin and hidden from view when the storage bin is in the rearward position and the automatic or manual lock is engaged.

In another example, the interior space of the storage bin is accessible not only through the top of the storage bin, but also through an inner side of the storage bin (i.e., the side of the storage bin that faces the vehicle occupant sitting next to the storage bin). Thus, the access opening of the storage bin is relatively large compared to the access opening of most non-movable storage bins, making the interior compartment of the storage bin easier to access relative to the non-movable storage bins. In addition, the inner side of the storage bin may be covered by a door that pivots open due to gravity as the storage bin translates to the forward position. This allows the interior compartment of the storage bin to be larger than the interior compartments of most non-movable storage bins while maintaining a large access opening located in a position enabling ease of access.

Figure 1:
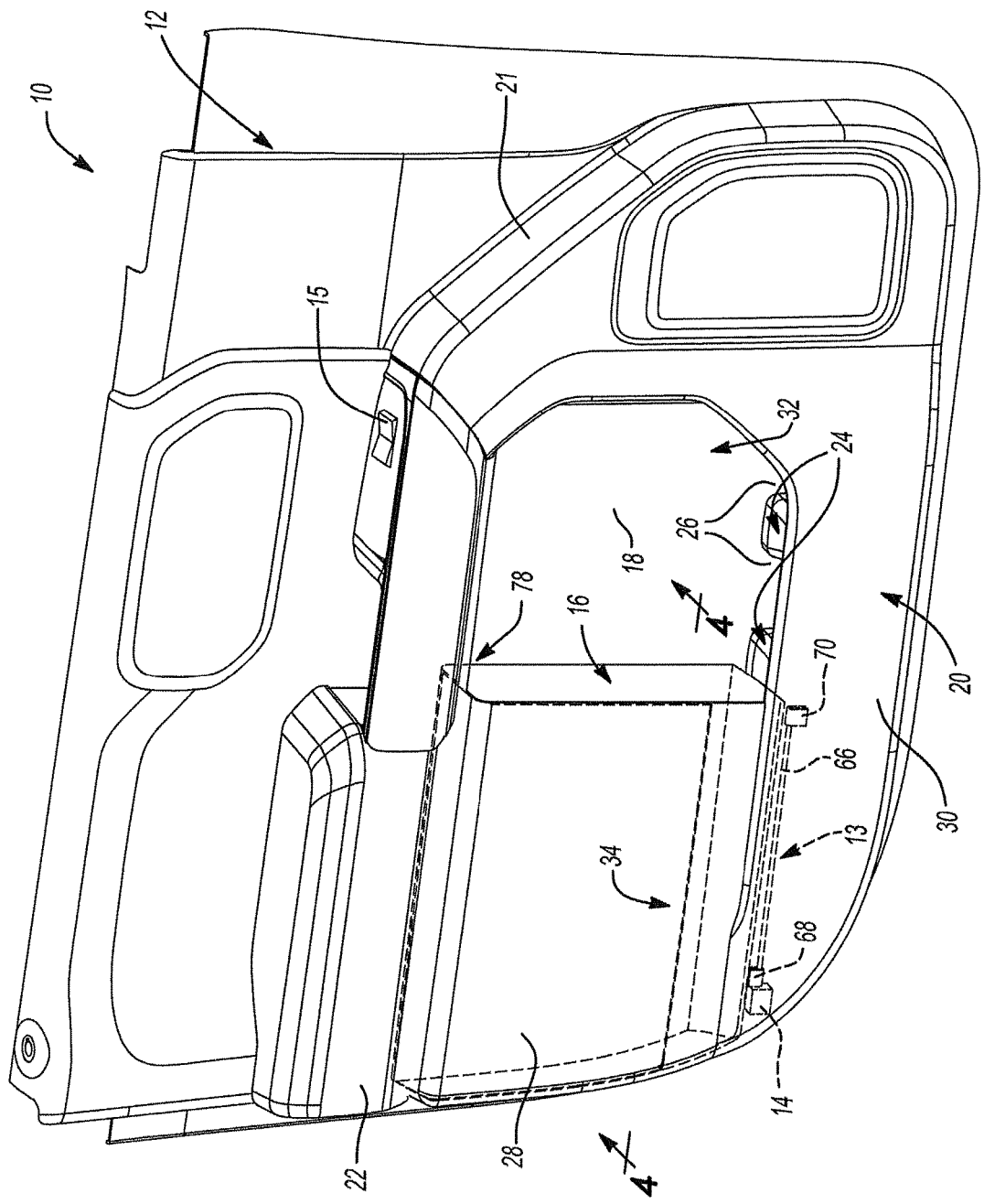
FIG. 1 is a perspective view of a door assembly according to the principles of the present disclosure, the door assembly including a storage bin shown in a rearward position.

Referring to FIGS. 1 through 3, a door assembly 10 is configured to be mounted in a vehicle (not shown). The door assembly 10 includes a door inner structure 12, a track 13, a motor 14, a bin switch 15, and a storage bin 16 that is translatable relative to the door inner structure 12 between a rearward position (FIG. 1) and a forward position (FIG. 2).

The door inner structure 12 may be made of plastic. The door inner structure 12 includes an outer side panel 18, an inner side panel 20, a perimeter panel 21, an armrest 22, a support shelf 24, and one or more cup holders 26. In the example shown, the door inner structure 12 includes two of the cup holders 26.

The inner side panel 20 is disposed laterally inboard of the outer side panel 18 and includes a first portion 28 and a second portion 30. The first portion 28 of the inner side panel 20 has a rectangular shape and hides the entire storage bin 16, including an interior compartment 34 thereof, when the storage bin 16 is in the rearward position. Thus, the interior compartment 34 may be used to hold valuable items such as a tablet. The second portion 30 of the inner side panel 20 cooperates with the first portion 28 and the armrest 22 to define an access opening 32 that provides access to the interior compartment 34 of the storage bin 16 when the storage bin 16 is in the forward position. The first and second portions 28 and 30 of the inner side panel 20 may be integrally formed as a single panel or formed separately and attached to one another.

The perimeter panel 21 and the armrest 22 project laterally inward from the outer side panel 18. The perimeter panel 21 extends around the perimeter of the inner side panel 20. The armrest 22 is disposed above the storage bin 16. In various implementations, the armrest 22 may include a power source (not shown), such as an outlet, disposed on an underside surface 78 of the armrest 22. The power source may be accessible when the storage bin 16 is in the rearward position, the forward position, or any position therebetween. When the storage bin 16 is in the forward position, there may be a gap between the front end 46 of the storage bin 16 and the front end or edge of the access opening 32 as shown in FIG. 2 such that the outer panel 18 is visible. Alternatively, when the storage bin 16 is in the forward position, the front end 46 of the storage bin 16 may be flush with or forward of the front edge of the access opening 32 such that the outer panel 18 is not visible.

The support shelf 24 is configured to support the storage bin 16 when the storage bin 16 is in the rearward position and when the storage bin 16 is in the forward position. As shown in FIG. 3, the support shelf 24 has a rearward surface 36 and a forward surface 38. The rearward surface 36 of the support shelf 24 is disposed below the storage bin 16 when the storage bin 16 is in the rearward position. The forward surface 38 of the support shelf 24 is discontinuous from the rearward surface 36 and is disposed below the storage bin 16 when the storage bin 16 is in the forward position. The cup holders 26 form the forward surface 38 of the support shelf 24.

Referring still to FIG. 3, the support shelf 24 defines a groove or channel 40 that extends into the rearward surface 36 of the support shelf 24. The track 13 and the motor 14 are disposed in the channel 40. The track 13 and the motor 14 may be mounted to a bottom surface 42 (FIGS. 4 and 5) of the channel 40 using fasteners and/or adhesive.

With continued reference to FIG. 3, the storage bin 16 includes a main body 44 having a front end 46 and a rear end 48 and defining the interior compartment 34. The main body 44 of the storage bin 16 includes an outer side panel 50, an inner side panel 52, a front panel 54, a rear panel 56, and a bottom panel 58. The outer side, inner side, front, and rear panels 50, 52, 54, and 56 cooperate to define an access opening 60 that provides access to the interior compartment 34 of the storage bin 16. In the example shown, a height 62 of the inner side panel 52 is less than a height 64 of the outer side panel 50 to increase the size of the access opening 60.

The storage bin 16 may also include a top panel (not shown) that cooperates with the outer side, inner side, front, and rear panels 50, 52, 54, and 56 to define the access opening 60 (and to define the perimeter of the storage bin 16).

With additional reference to FIGS. 4 and 5, the track 13 includes a mechanical actuation system including a threaded rod 66, a bin nut 68, and an end support 70. The storage bin 16 is attached to the bin nut 68 using, for example, a fastener, a snap-in feature, a capture feature, and/or adhesive. The motor 14 supports a first end 72 of the threaded rod 66, and the end support 70 supports a second end 74 of the threaded rod 66 opposite of the first end 72 while allowing the threaded rod 66 to rotate. The motor 14 is operable to translate the bin nut 68 in a fore-aft direction 76 by rotating the threaded rod 66. Since the storage bin 16 is attached to the bin nut 68, the storage bin 16 translates between the rearward position (FIGS. 1 and 4) and the forward position (FIGS. 2 and 5) as the motor 14 translates the bin nut 68 in the fore-aft direction 76.

The threaded rod 66, the bin nut 68, and/or the end support 70 may be made of metal and/or plastic. In one example, the bin nut 68 and the storage bin 16 are integrally formed (e.g., molded) together from plastic. Additionally or alternatively, the bin nut 68 may not fully enclose the threaded area (i.e., the internal threads on the bin nut 68 may not extend completely around the circumference of the threaded rod 66). Instead, the bin nut 68 may define a threaded bearing surface that extends around only the top surface of the threaded rod 66, and a mechanism (e.g., a compression spring) may maintain contact between the bearing surface and the threaded rod 66).

The bin switch 15 is disposed in the armrest 22 and is operable to activate the motor 14 in order to translate the storage bin 16 between the rearward position and the forward position. For example, a vehicle occupant may press the bin switch 15 downward to translate the storage bin 16 to the forward position, and the vehicle occupant may pull the bin switch 15 upward to translate the storage bin 16 to the rearward position. The bin switch 15 may be electrically connected to the motor 14 via a wired or wireless connection. The bin switch 15 may only be operable to activate the motor 14 when an ignition key or switch (not shown) of the vehicle is in an ON position. Thus, when the ignition key or switch is in an OFF position, the motor 14 may act as a lock that prevents the storage bin 16 from translating to the forward position, and thereby prevents access to the interior compartment 34 of the storage bin 16, In the example shown, the door assembly 10 includes only the track 13 and the motor 14, and the track 13 is mounted to the support shelf 24. However, in various implementations, the door assembly 10 may include more than one track and more than one motor, and the tracks may be mounted to other components in addition to or instead of the support shelf 24. For example, the tracks may be mounted to the outer side panel 18 and/or to an underside surface 78 (FIGS. 1-3) of the armrest 22.

Figure 6:
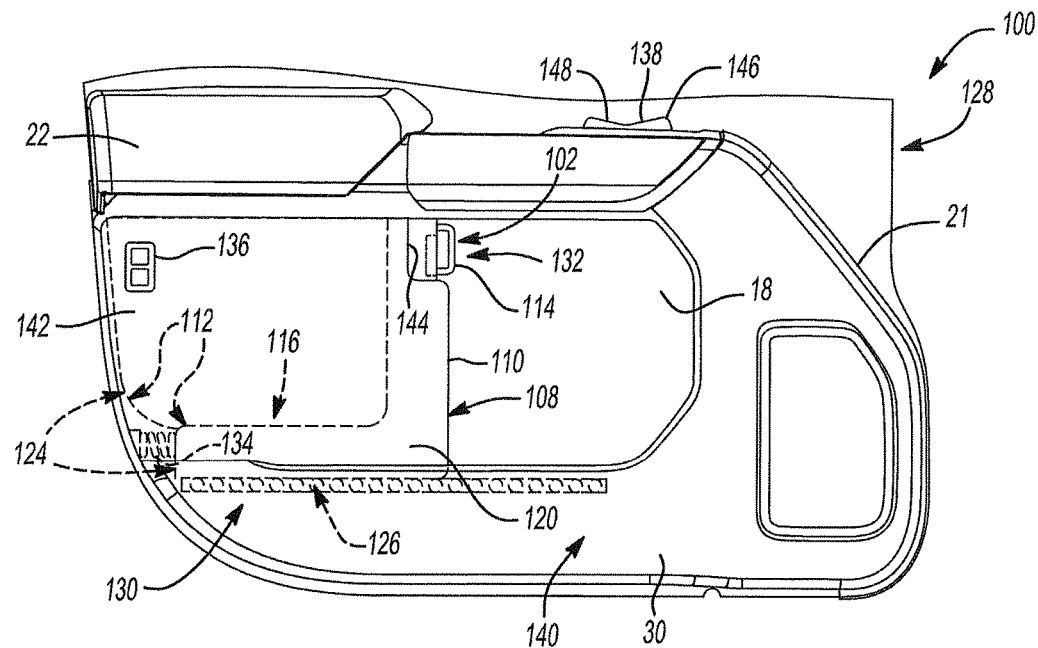
FIG. 6 is a side view of another door assembly according to the principles of the present disclosure, the door assembly including a handle, a latch, a track, and a storage bin shown in a rearward position.
Figure 7:
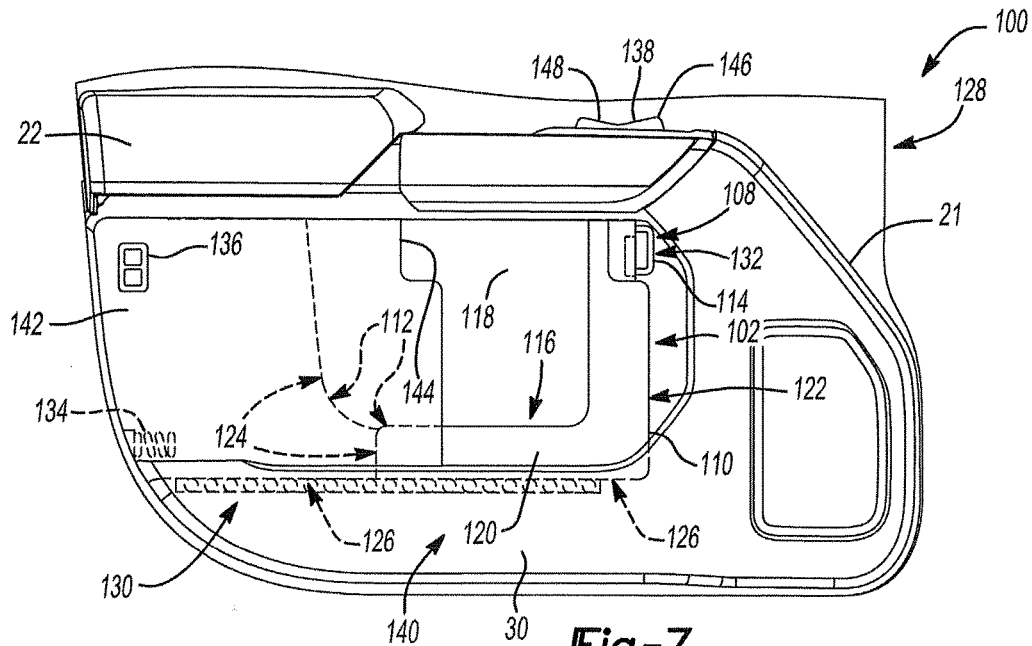
FIG. 7 is a side view of the door assembly of FIG. 6 with the storage bin in a forward position.

The storage bin 16 of the door assembly 10 may be referred to as an automatic storage bin since a vehicle occupant can use the bin switch 15 to translate the storage bin 16 between the rearward position and the forward position without touching the storage bin 16. In contrast, FIGS. 6 and 7 show a door assembly 100 including a storage bin 102 that is manually translatable relative to the door inner structure 12 between a rearward position (FIG. 6) and a forward position (FIG. 7). The door assembly 100 does not include a motor for translating the storage bin 102. Thus, the storage bin 102 of the door assembly 100 may be referred to as a manual storage bin.

The storage bin 102 includes a main body 108 having a front end 110 and a rear end 112, and the storage bin 102 includes a handle 114 attached to the front end 110 of the main body 108. The main body 108 of the storage bin 102 defines an interior compartment 116 configured to hold items such as a tablet. The main body 108 of the storage bin 102 includes an outer side panel 118 (FIG. 7), an inner side panel 120 disposed laterally inboard of the outer side panel 118, a front panel 122, a rear panel 124, and a bottom panel 126. A vehicle occupant may apply a force to the handle 114 to translate the storage bin 102 between the rearward position and the forward position. When the storage bin 102 is in the forward position, there may be a gap between the front end 110 of the storage bin 102 and the front end or edge of the access opening 32 as shown in FIG. 6 such that the outer panel 18 is visible. Alternatively, when the storage bin 16 is in the forward position, the front end 110 of the storage bin 102 may be flush with or forward of the front edge of the access opening 32 such that the outer panel 18 is not visible.

The door assembly 100 further includes a door inner structure 128, a track 130, a latch 132, an optional biasing member 134, an electric lock 136, and a lock switch 138. The door inner structure 128 is similar to the door inner structure 12 in that the door inner structure 128 includes the outer side panel 18, an inner side panel 140, the perimeter panel 21, and the armrest 22. In addition, although not shown, the door inner structure 128 may include the support shelf 24 and the cup holders 26.

The inner side panel 140 of the door inner structure 128 is similar to the inner side panel 20 of the door inner structure 12 in that the inner side panel 140 includes a first portion 142 and the second portion 30. However, the first portion 142 of the inner side panel 140 is slightly different than the first portion 28 of the inner side panel 20. To this end, the first portion 142 of the inner side panel 140 defines a notch 144 that provides access to the handle 114 when the storage bin 102 is in the rearward position. Thus, when the storage bin 102 is in the rearward position, the first portion 142 of the inner side panel 140 hides the interior compartment 116 of the storage bin 102 while leaving access to the handle 114.

The track 130 may be a slide track such as the slide tracks discussed below with reference to FIGS. 10 and 11. Thus, the storage bin 102 is attached to the door inner structure 128 through the track 130 and is translatable on the track 130 between the rearward position and the forward position.

The latch 132 maintains the storage bin 102 in the rearward position absent an external force applied to the storage bin 102 that is sufficient to overcome a retaining force of the latch 132. The optional biasing member 134 biases the storage bin 102 toward the forward position to assist a vehicle occupant in overcoming the retaining force of the latch 132 when moving the storage bin 102 from the rearward position to the forward position. The biasing member 134 is disposed between the door inner structure 12 and the rear end 112 of the storage bin 102, and applies a biasing force to the rear end 112. The biasing member 134 may be a compression spring.

The electric lock 136 is operable to lock the storage bin 102 in the rearward position. For example, the electric lock 136 may engage the outer side panel 118 of the storage bin 102 to lock the storage bin 102 in the rearward position. The lock switch 138 is operable to engage or disengage the electric lock 136 and thereby lock or unlock the storage bin 102. For example, a vehicle occupant may press a front end 146 of the lock switch 138 to engage the electric lock 136, and the vehicle occupant may press a rear end 148 of the lock switch 138 to disengage the electric lock 136. The lock switch 138 may generate a lock command signal when the front end 146 of the lock switch 138 is pressed, and the lock switch 138 may generate an unlock command signal when the rear end 148 of the lock switch 138 is pressed. The electric lock 136 may lock the storage bin 102 in response to the lock command signal and unlock the storage bin 102 in response to the unlock command signal. The lock switch 138 may communicate with the electric lock 136 using a wired or wireless connection. In various implementations, a mechanical lock may be used in addition to or instead of the electric lock 136, and a combination or a key may be used to engage or disengage the mechanical lock.

Figure 8:
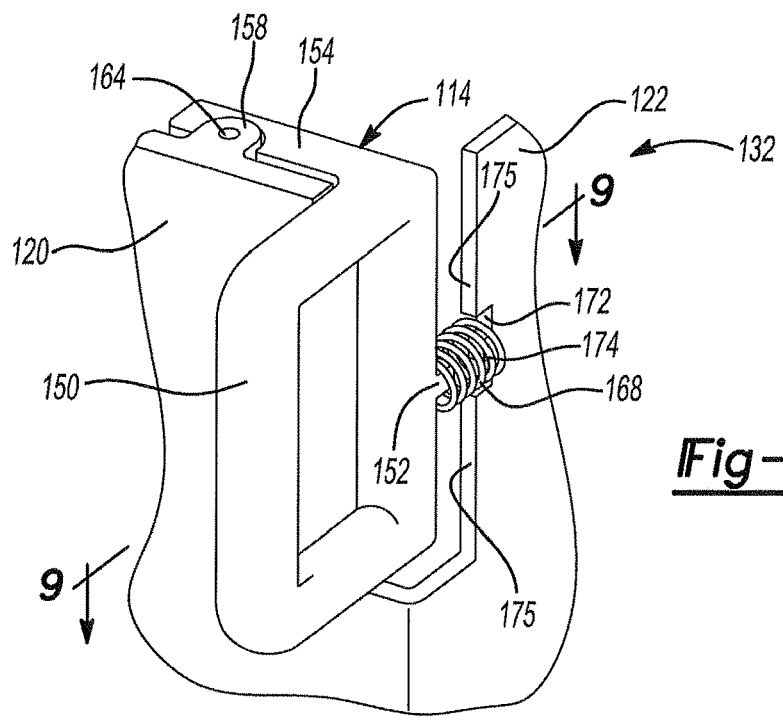
FIG. 8 is a perspective view of a portion of the door assembly of FIG. 6 including the handle and the latch.
Figure 9:
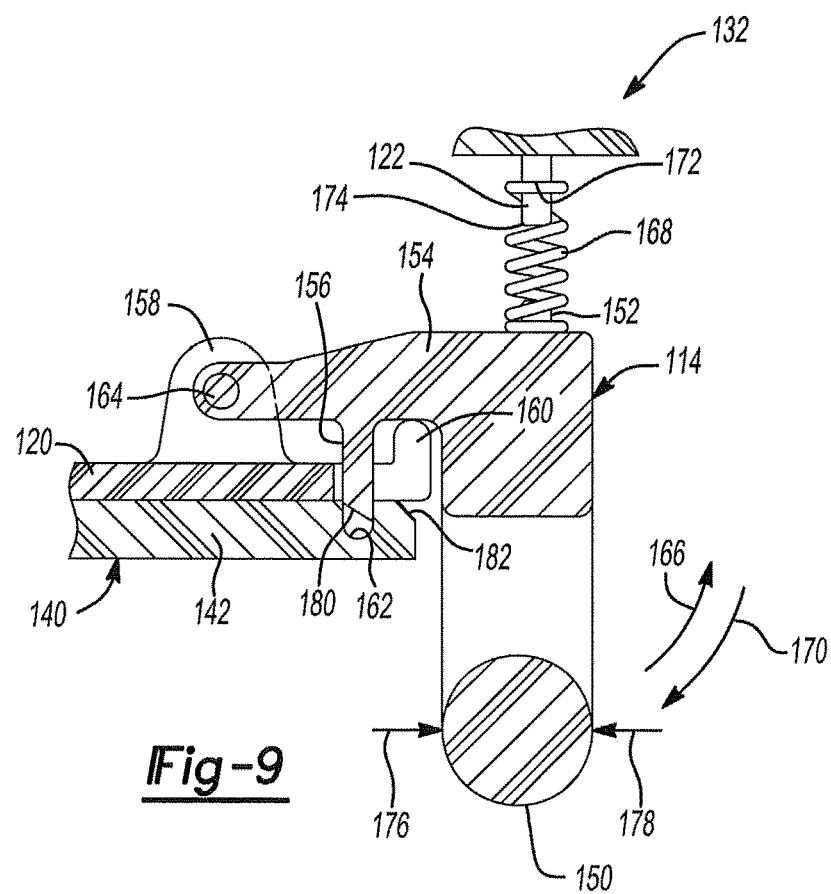
FIG. 9 is a sectioned top view of the portion of the door assembly of FIG. 6 shown in FIG. 8.

Referring to FIGS. 8 and 9, the handle 114, the latch 132, and portions of the inner side panel 120 of the storage bin 102, the front panel 122 of the storage bin 102, and the inner side panel 140 of the door inner structure 128 are shown in greater detail. One or more (e.g., all) of the components shown in FIGS. 8 and 9 may cooperate to form the latch 132. When the latch 132 is engaged as shown in FIGS. 8 and 9, the latch 132 maintains the storage bin 102 in the rearward position absent an external force applied to the storage bin 102 that is sufficient to overcome the retaining force of the latch 132. When the latch 132 is released, the latch 132 does not inhibit translation of the storage bin 102 from the rearward position to the forward position.

The handle 114 includes a graspable body 150, a spring retainer 152 projecting laterally outward from the graspable body 150, a pivot arm 154 projecting rearward from the graspable body 150, and a lock arm 156 projecting laterally inward from the graspable body 150. The inner side panel 120 of the storage bin 102 includes a hinge projection 158 and a travel stop 160. The first portion 142 of the inner side panel 140 of the door inner structure 128 defines a detent 162. When the latch 132 is engaged, the lock arm 156 of the handle 114 engages the detent 162 in the inner side panel 140.

A pivot pin 164 extends vertically through the hinge projection 158 on the inner side panel 120 of the storage bin 102 and through the pivot arm 154 on the handle 114 to pivotally connect the handle 114 to the inner side panel 120. The handle 114 is pivotable about the pivot pin 164 to engage or release the latch 132. When the latch 132 is engaged, the handle 114 may be rotated in a first direction 166 about the pivot pin 164 to disengage the lock arm 156 of the handle 114 from the detent 162 in the inner side panel 140 and thereby release the latch 132. When the latch 132 is released, a spring 168 applies a biasing force to the handle 114 that urges the handle 114 to rotate in a second direction 170 opposite of the first direction 166. When the handle 114 rotates in the second direction 170 when the storage bin 102 is in the rearward position, the lock arm 156 of the handle 114 engages the detent 162 in the inner side panel 140 and thereby engages the latch 132.

The front panel 122 of the storage bin 102 defines a rectangular notch 172 and includes a spring retainer 174 that projects laterally inward from the notch 172. The spring retainer 174 on the front panel 122 of the storage bin 102 cooperates with the spring retainer 152 on the handle 114 and to retain the spring 168 therebetween. In addition, the spring retainer 174 on the front panel 122 of the storage bin 102 and/or an inner edge 175 of the front panel 122 act as a travel stop by limiting the travel of the handle 114 as the handle 114 rotates in the first direction 166. Similarly, the travel stop 160 on the inner side panel 120 limits the travel of the handle 114 as the handle 114 rotates in the second direction 170.

To translate the storage bin 102 from the rearward position to the forward position, a vehicle occupant applies a force to the handle 114 in a forward direction 176. In turn, the handle 114 rotates in the first direction 166 until the spring retainer 152 on the handle 114 contacts the spring retainer 174 on the storage bin 102 and/or until the handle 114 contacts the inner edge 175 of the front panel 122. As the handle 114 rotates in the first direction, the lock arm 156 of the handle 114 disengages from the detent 162 in the inner side panel 140, which releases the latch 132. Once the latch 132 is released, the storage bin 102 translates on the track 130 to the forward position due to the force applied to the handle 114 in the forward direction 176. When the vehicle occupant releases the handle 114 while the storage bin 102 is in the forward position, the handle 114 rotates in the second direction 170 due to the biasing force of the spring 169. However, the lock arm 156 of the handle 114 does not engage the detent 162 in the inner side panel 140 since the storage bin 102 is not in the rearward position.

To translate the storage bin 102 from the forward position to the rearward position, a vehicle occupant applies a force to the handle 114 in a rearward direction 178. As the storage bin 102 travels in the rearward direction 178 due to the force applied by the vehicle occupant, a ramped surface 180 on the lock arm 156 of the handle 114 engages a ramped surface 182 on the first portion 142 of the inner side panel 140. This engagement causes the handle 114 to rotate in the first direction 166, which allows the lock arm 156 of the handle 114 to move past the ramped surface 182 of the inner side panel 140 and, ultimately, allows the storage bin 102 to translate to the rearward position. Alternatively, if the handle 114 is being pulled rearward with a high force, the engagement may cause the first portion 142 of the inner side panel 140 to burp (elastically deform) inward, which allows the lock arm 156 of the handle 114 to move past the ramped surface 182 of the inner side panel 140 and, ultimately, allows the storage bin 102 to translate to the rearward position. When the storage bin 102 reaches the rearward position, the handle 114 rotates in the second direction 170 due to the biasing force of the spring 168. The handle 114 rotates in the second direction 170 until the handle 114 contacts the travel stop 160 on the inner side panel 120 of the storage bin 102. At that point, the lock arm 156 of the handle 114 is engaged with the detent 162 in the inner side panel 140, and therefore the latch 132 is engaged.

Referring to FIG. 10, a door assembly 200 is similar to the door assembly 10 in that the door assembly 10 includes the outer side panel 18, an armrest 202, the support shelf 24, the cup holders 26, and a storage bin 204 that is translatable in a fore-aft direction 206. Although not shown, the door assembly 200 may also include the inner side panel 20 and the perimeter panel 21. However, in contrast to the door assembly 10, the door assembly 200 does not include a motor that translates the storage bin 204. Thus, the storage bin 204 may be referred to as a manual storage bin. Also, in contrast to the door assembly 10, and the door assembly 200 includes a first track 208, a second track 210, and a third track 212 instead of a single track. In addition, the armrest 202 of the door assembly 200 includes an underside portion 214 that forms part of the third track 212. Further, the storage bin 204 includes a top panel 216 in addition to the outer side, inner side, front, rear, and bottom panels 50, 52, 54, 56, and 58.

The first track 208 is mounted to the outer side panel 18 and includes a guide rail 218 and a slide 220 that is slidable in the guide rail 218 in the fore-aft direction 206. The slide 220 includes a mounting plate 222 and a slide projection 224 that projects laterally outward from the mounting plate 222. The guide rail 218 defines a guide channel 226, and the slide projection 224 is captured in and slides within the guide channel 226. The storage bin 204 is attached the mounting plate 222 of the slide 220 using, for example, fasteners, snap-in features, capture features, and/or adhesive. The first track 208 may also include ball bearings disposed between the slide projection 224 and the guide channel 226, and/or a Teflon® or other low-friction coating disposed on the slide projection 224 and/or the guide channel 226, to reduce friction as the slide projection 224 slides within the guide channel 226.

The second track 210 is mounted to the outer side panel 18 and includes a guide rail 228 and a slide 230 that is slidable in the guide rail 228 in the fore-aft direction 206. The slide 230 includes a mounting plate 232 and a slide projection 234 that projects downward from the mounting plate 232. The guide rail 228 defines a guide channel 236, and the slide projection 234 is captured in and slides within the guide channel 236. The storage bin 204 is attached the mounting plate 232 of the slide 230 using, for example, fasteners and/or adhesive. The second track 210 may also include ball bearings disposed between the slide projection 234 and the guide channel 236, and/or a Teflon® coating disposed on the slide projection 234 and/or the guide channel 236, to reduce friction as the slide projection 234 slides within the guide channel 236.

Referring to FIG. 11, the third track 212 includes a guide rail 237 and a slide 238 that is slidable in the guide rail 237 in the fore-aft direction 206. The guide rail 237 is formed by the underside portion 214 of the armrest 202, and the slide 238 is attached to the top panel 216 of the storage bin 204. In the example shown in FIG. 11, the slide 238 is integrally formed with the top panel 216 of the storage bin 204. The slide 238 includes a vertical plate 239 and a horizontal plate 240 that projects laterally outward and inward from the mounting plate 238. The guide rail 237 defines a guide channel 242, and the horizontal plate 240 is captured in and slides within the guide channel 242. The third track 212 also includes ball bearings 244 disposed between the slide projection 240 and the guide channel 242 to reduce friction as the slide projection 240 slides within the guide channel 242. Additionally or alternatively, the third track 212 may include a Teflon® or other low-friction coating disposed on the slide projection 240 and/or the guide channel 242.

Figure 12:
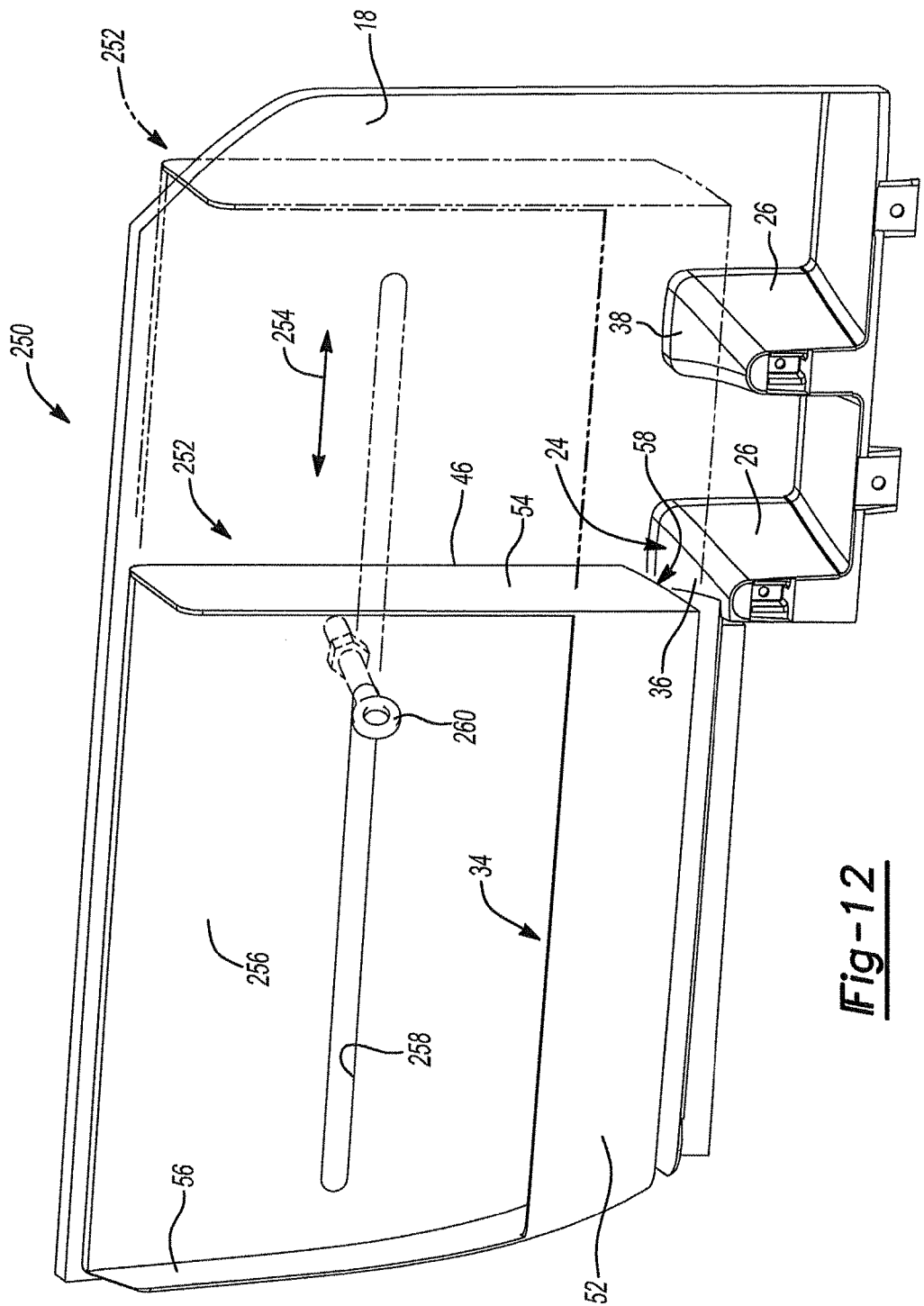
FIG. 12 is a perspective view of another door assembly according to the principles of the present disclosure, the door assembly including a storage bin and a fastener extending through a slot in the storage bin and into a door inner structure.

Referring to FIG. 12, a door assembly 250 is similar to the door assembly 10 in that the door assembly 250 includes the outer side panel 18, the support shelf 24, the cup holders 26, and a storage bin 252 that is translatable in a fore-aft direction 254 between a rearward position and a forward position. The storage bin 252 in the rearward position is depicted using solid lines, and the storage bin 252 in the forward position is depicted using phantom lines. Although not shown, the door assembly 250 may also include the inner side panel 20, the perimeter panel 21, and the armrest 22. In addition, like the storage bin 16 of the door assembly 10, the storage bin 252 includes an outer side panel 256, the inner side panel 52, the front panel 54, the rear panel 56, and the bottom panel 58, and the storage bin 16 has the interior compartment 34.

However, in contrast to the outer side panel 50 of the storage bin 16, the outer side panel 256 of the storage bin 252 defines an opening or slot 258. Also, in contrast to the door assembly 10, the door assembly 250 further includes a fastener 260, such as an eyebolt, that extends through the slot 258 in the outer side panel 256 and is attached to the outer side panel 18 or other rigidly mounted door structure. The slot 258 in the storage bin 252 allows the storage bin 252 to translate between the rearward position and the forward position without interfering with the fastener 260. The fastener 260 is attachable to items stored in the storage bin 252 when the storage bin 252 is in the rearward position, the forward position, and any position therebetween. Thus, the fastener 260 can be used to secure the items to the outer side panel 18 or other rigidly mounted door structure. For example, a lockbox, laptop, or tablet stored in the storage bin 252 can be tethered to the fastener 260. In addition, it is also possible to position the fastener 260 so that it routs through the open top of the storage bin 252. In this manner, the fastener 260 is attachable to items stored in the storage bin 252 when the storage bin 252 is in the rearward position, the forward position, and any position therebetween without the need for the slot 258.

Figure 13:
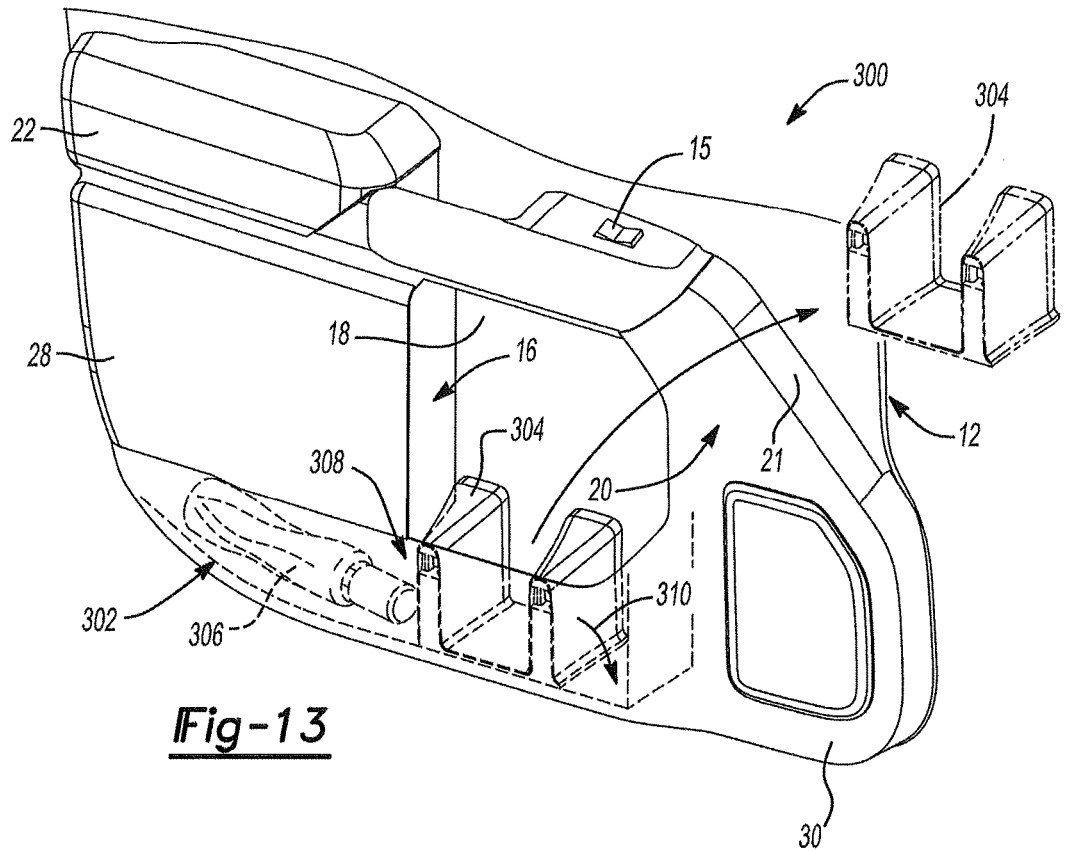
FIG. 13 is a perspective view of another door assembly according to the principles of the present disclosure, the door assembly including a storage bin, a storage compartment disposed below the storage bin, and a cup holder that is removable or collapsible to provide access to the storage compartment.

Referring to FIG. 13, a door assembly 300 is similar or identical to the door assembly 10 of FIGS. 1-5 except that the door assembly 300 includes a storage compartment 302 disposed below the rearward surface 36 (FIG. 3) of the support shelf 24. In addition, the door assembly 300 includes a removable cup holder 304 instead of the cup holders 26 included in the door assembly 10. The cup holder 304 hides the storage compartment 302 when the cup holder 304 is installed in the door inner structure 12. In addition, the cup holder 304 prevents access to items stored in the storage compartment 302, such as an umbrella 306, when the cup holder 304 is installed in the door inner structure 12. The cup holder 304 is depicted in solid lines when the cup holder 304 is installed in the door inner structure 12. The storage compartment 302 and the cup holder 304 provide hidden storage space in addition to the hidden storage space provided by the storage bin 16.

The cup holder 304 may be removed from the door inner structure 12 by hand (e.g., removing the cup holder 304 does not require tools to, for example, remove fasteners). When the cup holder 304 is removed from the door inner structure 12, items stored in the storage compartment 302 may be accessed through an access opening 308. The cup holder 304 is depicted in phantom lines when the cup holder 304 is removed from the door inner structure 12. The access opening 308 is completely covered by the cup holder 304 when the cup holder 304 is installed in the door inner structure 12. In various implementations, the cup holder 304 may be collapsible and/or foldable in a downward direction 310 in addition to or instead of being removable. For example, the cup holder 304 may be formed by a number of panels and hinges that allow the panels to fold onto one another so that it can be collapsed to enable access through the access opening 308 without removing the cup holder 304 from the door inner structure 12.

Figure 14:
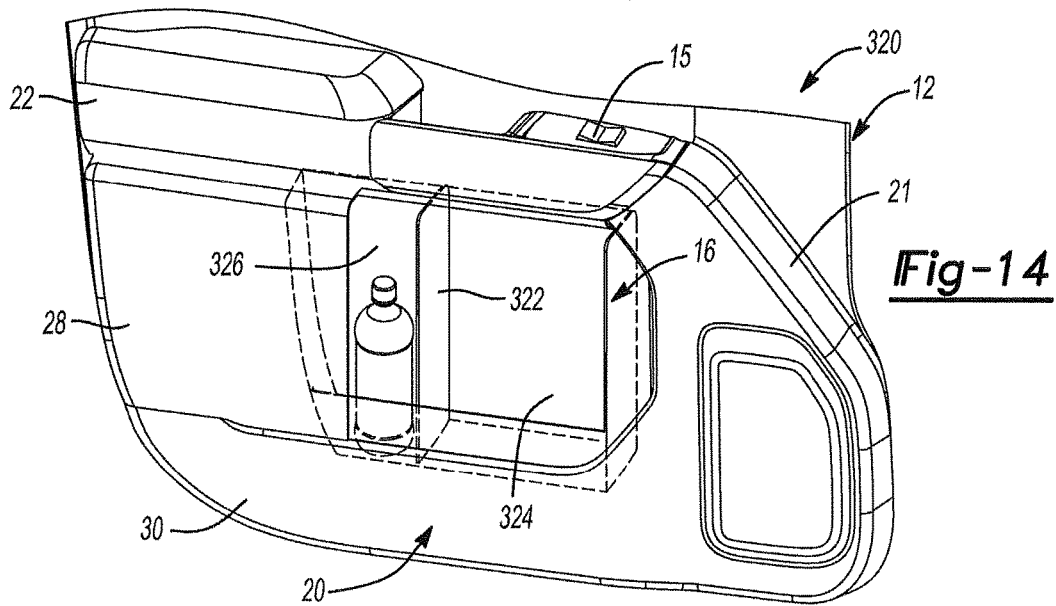
FIG. 14 is a perspective view of another door assembly according to the principles of the present disclosure, the door assembly including a storage bin and a divider disposed in an interior compartment the storage bin.

Referring to FIG. 14, a door assembly 320 is similar or identical to the door assembly 10 of FIGS. 1-5 except that the door assembly 320 includes a divider 322 disposed within the interior compartment 34 of the storage bin 16. The divider 322 divides the interior compartment 34 of the storage bin 16 into a front portion 324 and a rear portion 326 to assist with item organization. When the storage bin 16 is in the forward position as shown in FIG. 14, items stored in both the front and rear portion 324 and 326 of the storage bin 16 are accessible. However, when the storage bin 16 is at various positions between the rearward position and the forward position, the divider 322 hides the rear portion 326 of the storage bin 16 while items stored in the front portion 324 of the storage bin 16 are accessible. Thus, the divider 322 provides an added layer of security for items stored in the rear portion 326 of the storage bin 16. In various implementations, the divider 322 may be removed from the door inner structure 12 by hand and/or foldable or collapsible to provide access to the rear portion 326 of the storage bin 16. In addition, the divider 322 may be oriented horizontally instead of vertically as shown in FIG. 14, or the divider 322 may be oriented at an angle with respect to the horizontal and vertical planes.

Figure 15:
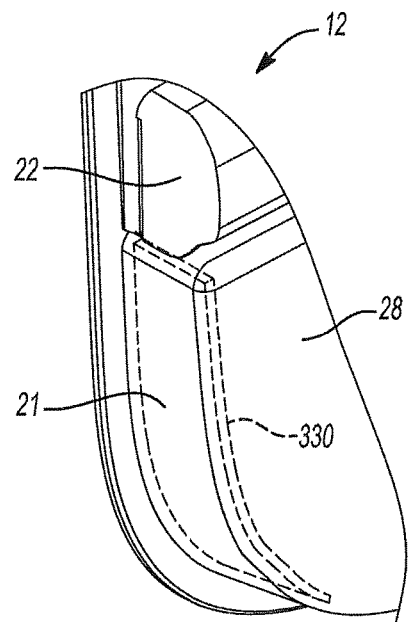
FIGS. 15 and 16 are perspective views of door inner structures including stiffeners according to the principles of the present disclosure.
Figure 16:
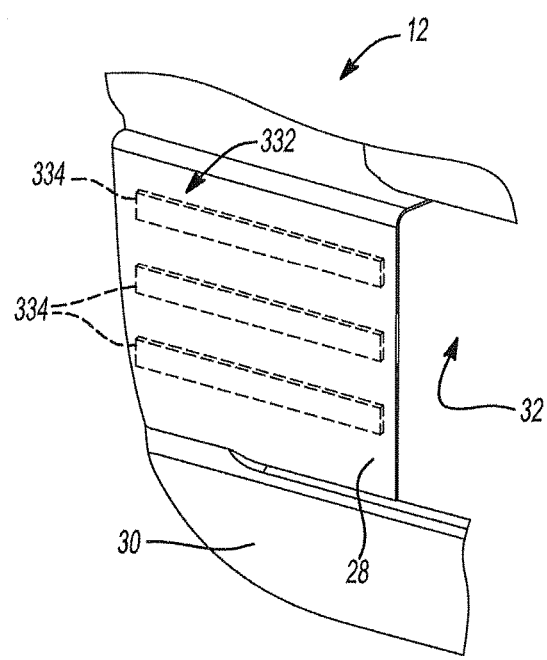

Referring to FIGS. 15 and 16, the door inner structure 12 may include various energy absorbing features that absorb energy when first portion 28 of the inner side panel 20 (i.e., the portion of the inner side panel 20 that hides the storage bin 16) is impacted by an object. The energy absorbing features may also distribute the loading of the object across the door inner structure 12. In FIG. 15, the door inner structure 12 includes an energy absorbing feature in the form of a stiffener 330 that is attached to the perimeter panel 21 of the door inner structure 12 and is disposed rearward of the storage bin 16. Additionally or alternatively, the door inner structure 12 may include a stiffener that is similar to the stiffener 330 and that is attached to the perimeter panel 21 and disposed forward of the storage bin 16.

In FIG. 16, the door inner structure 12 includes an energy absorbing feature in the form of a stiffener 332 attached to or integrally formed with the first portion 28 of the inner side panel 20. A majority of the door inner structure 12 may be made of a first material (e.g., plastic), and the stiffeners 330, 332 may be made of a second material (e.g., metal) that is stiffer than the first material and/or has a greater toughness than the first material (i.e., can absorb more energy without fracturing or rupturing relative to the first material). In one example, the stiffeners 330, 332 are metal plates, in which case the stiffeners 330, 332 may prevent thieves from breaking into the storage bin 16 in addition to absorbing energy. In another example, the stiffener 332 includes a plurality of ribs 334. The ribs 334 may be integrally formed with the first portion 28 of the inner side panel 20. In another example, one or both of the stiffeners 330, 332 may have weakening holes or features to introduce controlled deformation in regions where deformation is desired during impacts.

Figure 17:
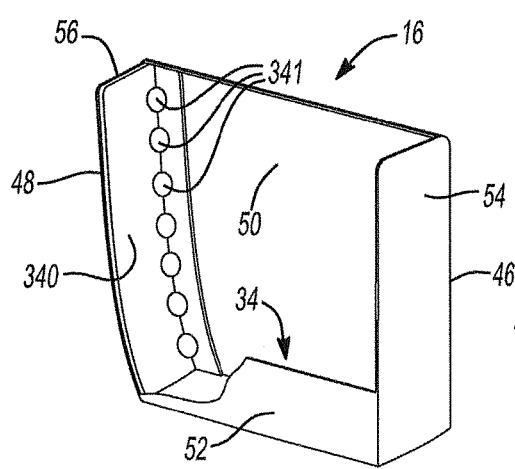
FIGS. 17 and 18 are perspective views of storage bins including energy absorbing features according to the principles of the present disclosure.
Figure 18:
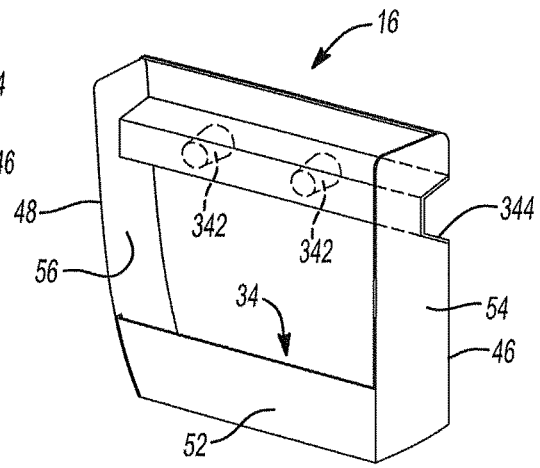

Referring to FIGS. 17 and 18, the storage bin 16 may also include various energy absorbing features that absorb energy when first portion 28 of the inner side panel 20 is impacted by an object. The energy absorbing features may also distribute the loading of the object across the door inner structure 12. In FIG. 17, the storage bin 16 includes an energy absorbing feature in the form of a plate 340 attached to the outer side and rear panels 50 and 56 of the storage bin 16 adjacent to the rear end 48 of the storage bin 16. Additionally or alternatively, the storage bin 16 may include a plate (not shown) that is similar to the plate 340 and that is attached to the outer side and front panels 50 and 54 of the storage bin 16 adjacent to the front end 46 of the storage bin 16. Additionally or alternatively, the plate 340 and/or the plate attached to the front panel 54 may be attached to the inner side panel 52 of the storage bin 16 in addition to or instead of being attached to the outer side panel 50 of the storage bin 16. The outer side, inner side, front, rear, and/or bottom panels 50, 52, 54, 56, and/or 58 of the storage bin 16 may be made from a first material (e.g., plastic), and the plate 340 may be made from a second material (e.g., metal) that is stiffer than the first material and/or has a greater toughness than the first material. In addition, the plate 340 may have weakening holes 341 or features to introduce controlled deformation in regions where deformation is desired during impact.

In FIG. 18, the storage bin 16 includes an energy absorbing feature in the form of a pair of protrusions 342 that are attached to the outer side panel 18 of the door inner structure 12 are disposed within a channel 344 that translates with the storage bin 16. The protrusions 342 project laterally inward from the outer side panel 18 of the door inner structure 12 and into the channel 344. The channel 344 may be defined by the outer side panel 50 of the storage bin 16 or separate from the outer side panel 50 and attached thereto. In various implementations, the protrusions 342 may be attached to and project laterally inward from the outer side panel 50 of the storage bin 16. Each of the protrusions 342 may have a conical frustum shape as shown.

In various implementations, a door assembly according to the present disclosure may include a block of material that is sized to fill the interior compartment of a storage bin when the storage bin is not being used to hold items. The material from which the block is made may be configured to absorb sound and to absorb energy in the event that a side panel of the storage bin is impacted. The block may be removed from the interior compartment of the storage bin by hand.

Figure 19:
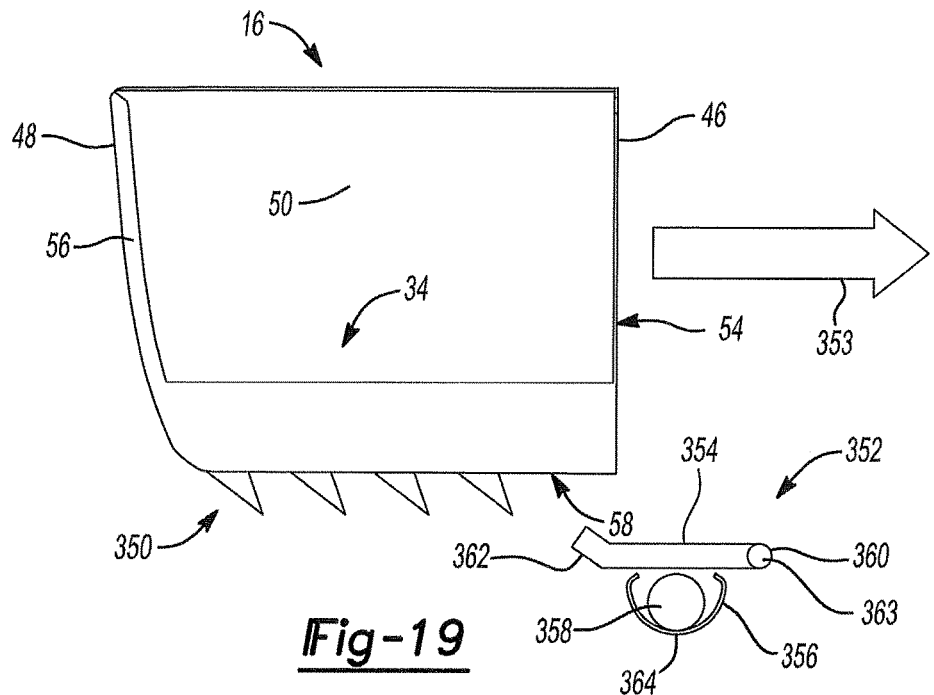
FIGS. 19 through 23 are section views of a storage bin and an inertial element for preventing the storage bin from translating during high vehicle deceleration according to the principles of the present disclosure.
Figure 20:
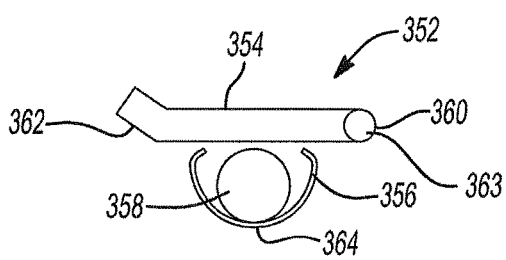
Figure 21:
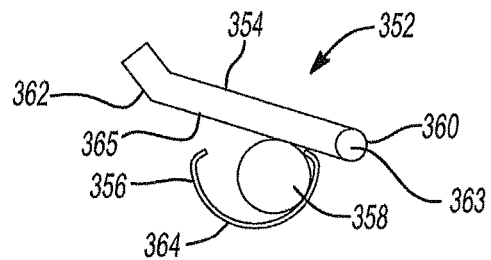

Referring to FIGS. 19-21, a door assembly according to the present disclosure may include a plurality of teeth 350 attached to the bottom panel 58 of the storage bin 16, and an inertial element subassembly 352 configured to selectively engage the teeth 350. The inertial element subassembly 352 may engage the teeth 350 to prevent the storage bin 16 from translating forward away from the rearward position during hard braking or during a crash event. The teeth 350 project downward from the bottom panel 58 of the storage bin 16 and extend in a forward direction 353 toward the front end of the vehicle.

The inertial element subassembly 352 includes a lever 354, a cup or bowl 356, and a ball 358. The lever 354 has a front end 360, a rear end 362, and a pivot point 363 located adjacent to the front end 360. The pivot point 363 of the lever 354 may be pivotally attached to the door inner structure 12 (FIGS. 1-3) or to another component of the inertial element subassembly 352 such as an extension of the bowl 356. The point 363 of the lever 354 may be pivotally attached to the door inner structure 12 at a location from which the lever 354 can pivot to engage the teeth 350 when the storage bin 16 is in the rearward position. For example, the front end 360 of the lever 354 may be pivotally attached to the rear one of the cup holders 26 or to the support shelf 24 shown in FIGS. 1-3. The support shelf 24 and the cup holders 26 may be designed so that the teeth 350 do not contact the support shelf 24 or the cup holders 26 during fore-aft translation of the storage bin 16.

The ball 358 is allowed to roll freely within the bowl 356. When the vehicle is stationary or is accelerating or decelerating at a low rate, the ball 358 remains at or near a center 364 of the bowl 356 as shown in FIGS. 19 and 20. However, during hard braking or during a crash event, the ball 358 rolls up in the bowl 356 in the forward direction 353 (FIG. 19) and engages an underside surface 365 of the lever 354 adjacent to its front end 360 as shown in FIG. 21. In turn, the rear end 362 of the lever 354 pivots upward and engages the teeth 350, which prevents the storage bin 16 from translating forward away from the rearward position. In one example, the ball 358 is configured to move the lever 354 into engagement with the teeth 350 to prevent the storage bin 16 from translating relative to the door inner structure 12 when a magnitude of vehicle deceleration is greater than a threshold (e.g., a predetermined value). This may be achieved by adjusting the mass and/or geometry of the lever 354, the bowl 356, and/or the ball 358. In this manner, impacts from any direction may cause the ball 358 to roll up the bowl 356 and engage the lever 354.

Figure 22:
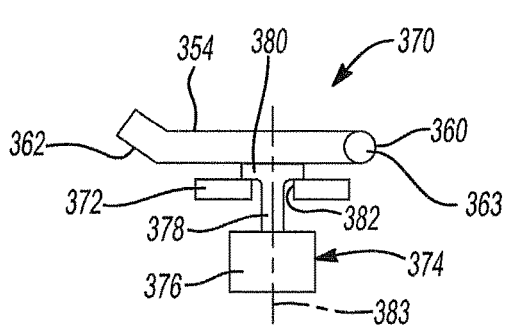
Figure 23:
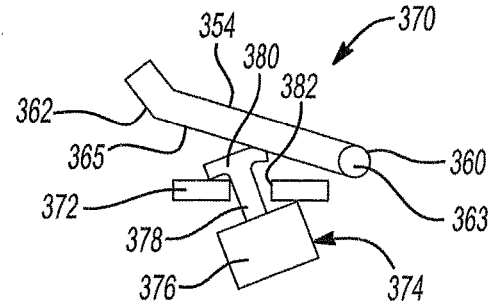

FIGS. 22 and 23 show an inertial element subassembly 370 that includes a disc or plate 372 and a pendulum 374 instead of the bowl 356 and the ball 358. The pendulum 374 includes a main body 376, a neck 378, and a head 380. The main body 376 is disposed below the plate 372, the head 380 is disposed above the plate 372, and the neck 378 extends through an opening 382 in the plate 372.

When the vehicle is stationary or is accelerating or decelerating at a low rate, the main body 376 of the pendulum 374 is centered about a vertical axis 383 that extends through the center of the opening 382. However, during hard braking or during a crash event, the main body 376 of the pendulum 374 swings in the forward direction 353 (FIG. 19) as shown in FIG. 23, which causes the head 380 of the pendulum 374 to engages the underside surface 365 of the lever 354 adjacent to its front end 360. In turn, the rear end 362 of the lever 354 pivots upward and engages the teeth 350, which prevents the storage bin 16 from translating forward away from the rearward position. In one example, the pendulum 374 is configured to move the lever 354 into engagement with the teeth 350 to prevent the storage bin 16 from translating relative to the door inner structure 12 when a magnitude of vehicle deceleration is greater than a threshold (e.g., a predetermined value). This may be achieved by adjusting the mass and/or geometry of the lever 354, the plate 372, and/or the pendulum 374. In this manner, impacts from any direction may cause the pendulum 374 to pivot and engage the lever 354.

Figure 24:
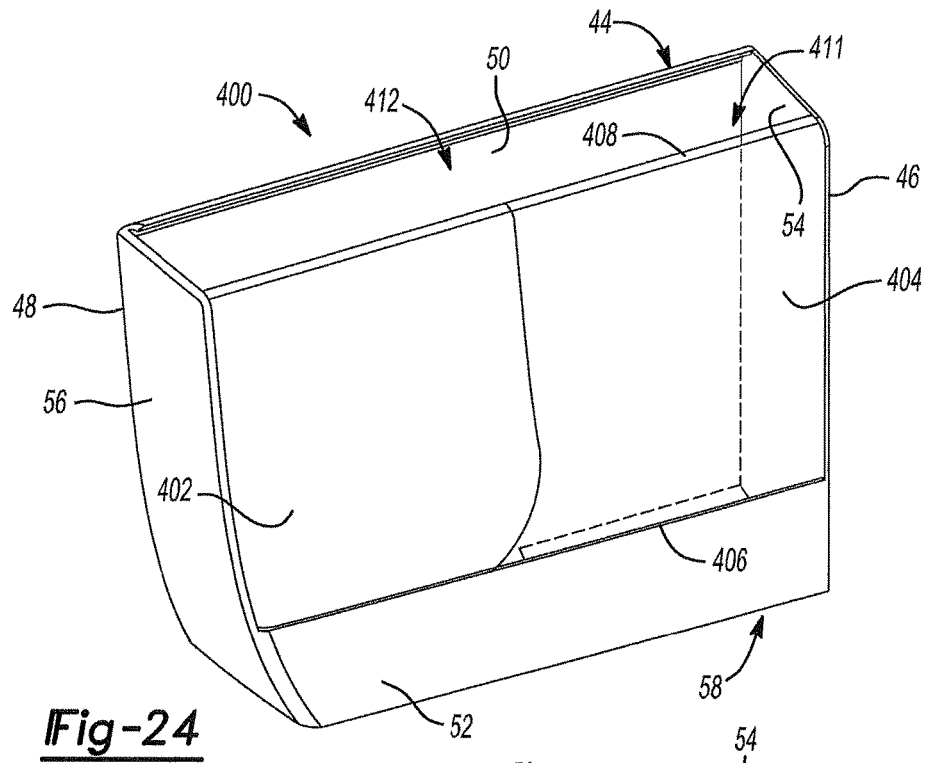
FIG. 24 is a perspective view of another storage bin according to the principles of the present disclosure, the storage bin including a hinged door shown in a closed position.
Figure 25:
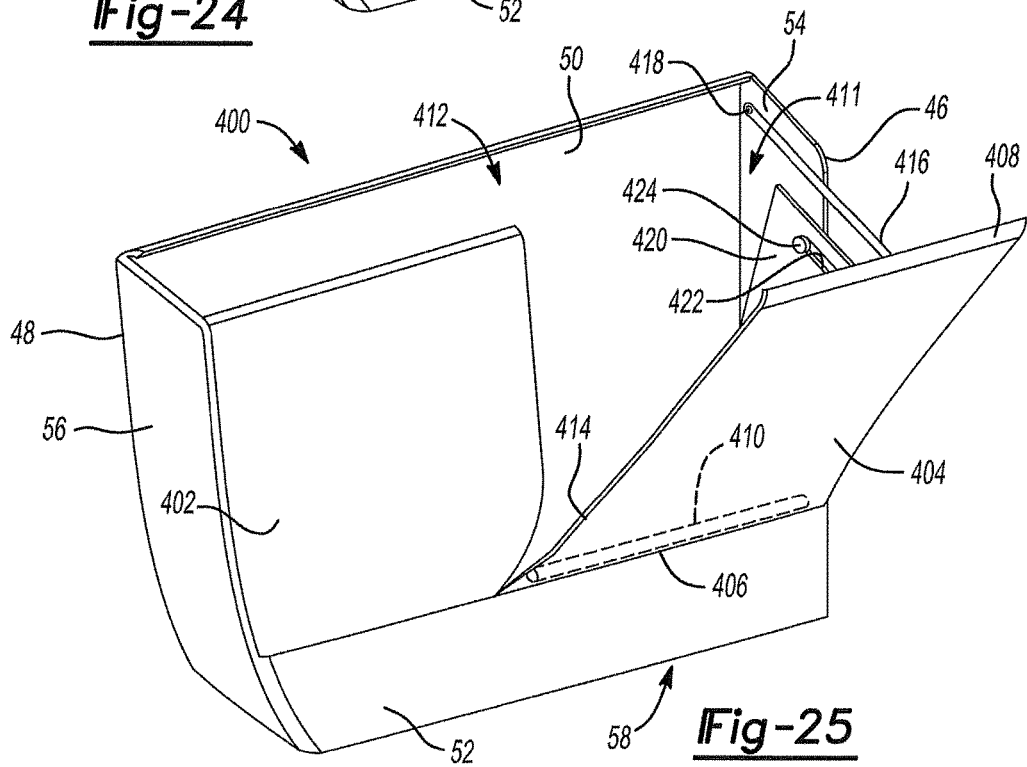
FIG. 25 is a perspective view of the storage bin of FIG. 23 with the hinged door in an open position.

Referring to FIGS. 24 and 25, a storage bin 400 is similar to the storage bin 16 in that the storage bin 400 includes the main body 44 having the outer side, inner side, front, rear, and bottom panels 50, 52, 54, 56, and 58. However, in contrast to the storage bin 16, the storage bin 400 also includes an inner side panel 402 and a hinged door 404. The inner side panel 402 may be considered part of the main body 44 and may be integrally formed with the remainder of the main body using, for example, injection molding. The hinged door 404 has a lower end 406 and an upper end 408. The lower end 406 of the hinged door 404 is attached to the main body 44 using a pivot pin 410 (FIG. 25) that extends through the lower end 406 of the hinged door 404 and into the front and inner side panels 54 and 402. Thus, the hinged door 404 is pivotable about the pivot pin 410. The pivot pin 410 may be integral to the hinged door 404 or the inner panel 52 of the storage bin 400.

The hinged door 404 is pivotable relative to the main body 44 from a closed position (FIG. 24) to an open position (FIG. 25) to increase the size of an access opening 411 providing access to an interior compartment 412 of the storage bin 400. When the storage bin 400 is in the rearward position, the first portion 28 of the inner side panel 20 maintains the hinged door 404 in the closed position. However, when the storage bin 400 translates to the forward position, the hinged door 404 pivots from the closed position to the open position due to gravity and/or a spring assist. When the storage bin 400 returns to the rearward position the hinged door 404 pivots from the open position to the closed position due to engagement with the inner side panel 20 of the door inner structure 12. More specifically, a rounded ramp surface 414 on the lower rearward portion of the hinged door 404 engages the first portion 28 of the inner side panel 20, causing the hinged door 404 to close.

The storage bin 400 may further include one or more stopper features that hold the hinged door 404 at a desired angle relative to the inner side panel 402 when the hinged door 404 is in the open position. The stopper features may include a cord 416 attached to the hinged door 404 and attached to the front panel 54 using an adjustable retention feature 418 (e.g., a screw clamp or a peg). Additionally or alternatively, the stopper features may include a forward wall 420 attached to the hinged door 404 and defining a slot 422, and a pin 424 extending through the slot 422 and attached to the front panel 54. Other mechanical stopper features include a spring and a molded retention dimple.

Figure 26:
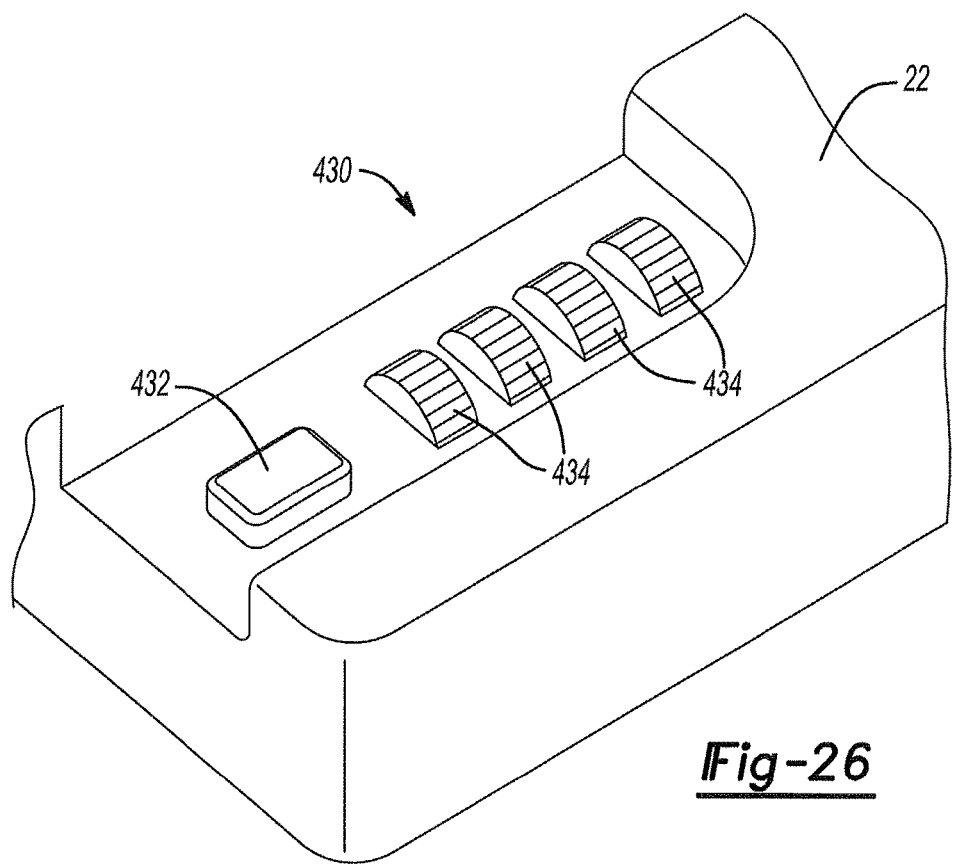
FIG. 26 is a perspective view of a dial lock for locking a storage bin according to the principles of the present disclosure.

Referring to FIG. 26, a switch 430 is disposed in the armrest 22 and is operable to translate a storage bin in the fore-aft direction, to lock the storage bin in the rearward position, and/or to unlock the storage bin. The switch 430 includes a button 432 and a plurality of dials 434. In one example, the button 432 may be pressed to translate the storage bin between in the fore-aft direction. In another example, the dials 434 may be rotated to lock and/or unlock the storage bin. In this regard, the switch 430 may be referred to as a dial lock. In various implementations, the switch 430 may be located in an instrument panel or a center console of a vehicle. Additionally or alternatively, the switch 430 may include a plurality of buttons instead of the dials 434, and the buttons may be pressed in a certain sequence to unlock, lock, and/or translate the storage bin.

Figure 27:
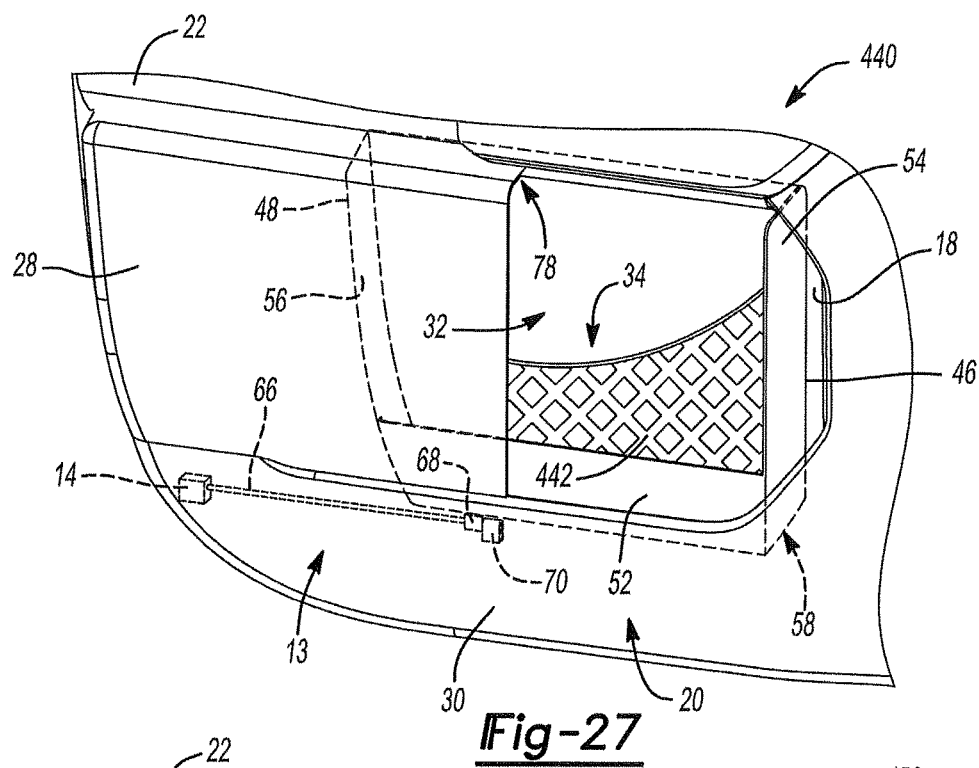
FIG. 27 is a perspective view of a storage bin including a mesh opening according to the principles of the present disclosure.

Referring to FIG. 27, a door assembly 440 is similar or identical to the door assembly 10 of FIGS. 1-5 except that the door assembly 440 includes netting or mesh 442 that partially covers the access opening 32. The mesh 442 increases the storage capacity of the storage bin 16. The mesh 442 may be attached to the storage bin 16 using, for example, a knob and loop configuration to allow the mesh 442 to be detached from the storage bin 16 by hand.

Figure 28:
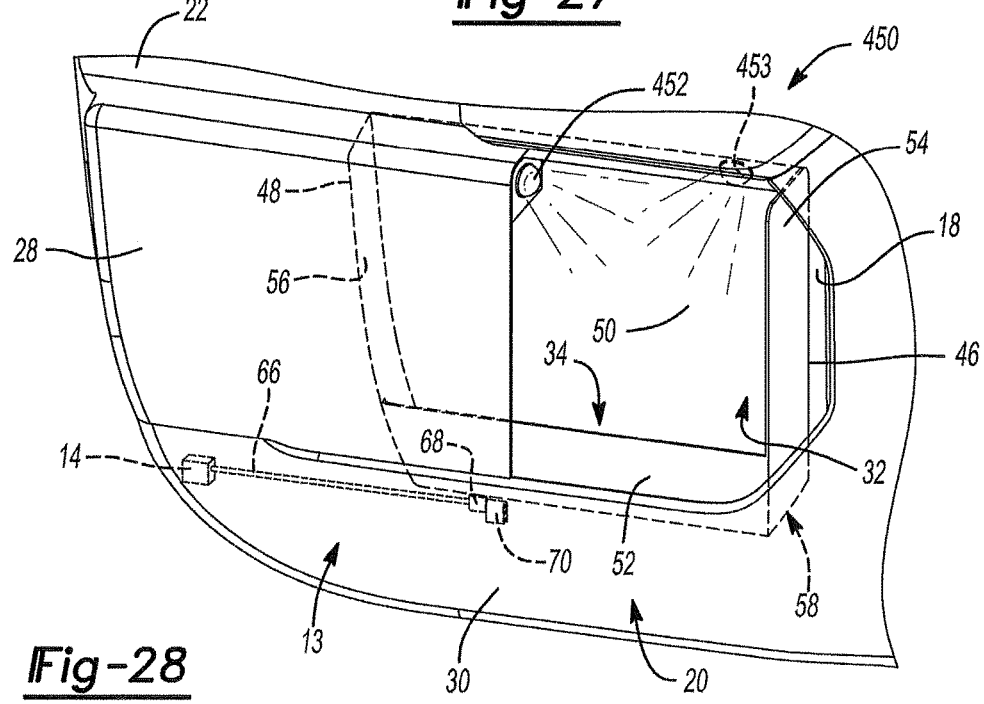
FIG. 28 is a perspective view of a storage bin including a light according to the principles of the present disclosure.

Referring to FIG. 28, a door assembly 450 is similar or identical to the door assembly 10 of FIGS. 1-5 except that the door assembly 450 includes a light 452 that automatically illuminates the storage bin 16 when the storage bin 16 is in the forward position. In one example, the door assembly 450 includes a position sensor (not shown) that detects the position of the storage bin 16 and a control module (not shown) that activates the light 452 when the position sensor indicates that the storage bin 16 is in the forward position. The position sensor may be included in the motor 14. Alternatively, the position sensor may be a stand-alone device if the light 452 is used in conjunction with a manual storage bin.

The door assembly 450 may also have a light 453 that does not move with the storage bin 16 and that illuminates the storage bin 16 when the storage bin 16 is in the forward position. The control module may activate the light 453 when the storage bin 16 is in the forward position. When the storage bin 16 is in the rearward position, the control module may deactivate the light 453 or the control module may continue to activate the light 453 to illuminate the open space forward of the storage bin 16. In this latter example, an ambient light controller of the vehicle may be used to control illumination and illumination color.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A vehicle door assembly comprising:
   a door inner structure including an outer side panel, an armrest projecting laterally inward from the outer side panel, and an inner side panel disposed laterally inboard of the outer side panel; and
   a storage bin disposed below the armrest, attached to the door inner structure, and translatable relative to the door inner structure between a rearward position and a forward position, the storage bin including a main body having an interior compartment configured to hold items, wherein:
the interior compartment of the storage bin is hidden by the inner side panel when the storage bin is in the rearward position;
the interior compartment of the storage bin is accessible when the storage bin is in the forward position;
the storage bin further includes a handle attached to a front end of the main body; and
the inner side panel hides the interior compartment of the storage bin while leaving access to the handle when the storage bin is in the rearward position.

2. A vehicle door assembly comprising:
a door inner structure including an outer side panel, an armrest projecting laterally inward from the outer side panel, and an inner side panel disposed laterally inboard of the outer side panel;
a storage bin disposed below the armrest, attached to the door inner structure, and translatable relative to the door inner structure between a rearward position and a forward position, the storage bin including a main body having an interior compartment configured to hold items, wherein the interior compartment of the storage bin is hidden by the inner side panel when the storage bin is in the rearward position, and wherein the interior compartment of the storage bin is accessible when the storage bin is in the forward position; and
a fastener extending into the interior compartment of the storage bin and attached to the door inner structure, wherein the fastener is attachable to items stored in the storage bin when the storage bin is in the rearward position and when the storage bin is in the forward position.

3. The vehicle door assembly of claim 2 wherein the storage bin defines a slot through which the fastener extends, the slot allowing the storage bin to translate between the rearward position and the forward position without interfering with the fastener.

4. A vehicle door assembly comprising:
a door inner structure including an outer side panel, a support shelf projecting laterally inward from the outer side panel, and an armrest projecting laterally inward from the outer side panel and disposed above the support shelf;
a storage bin disposed below the armrest, attached to the door inner structure, and translatable relative to the door inner structure between a rearward position and a forward position;
at least one track attached to at least one of the support shelf, the outer side panel, and the armrest, wherein the storage bin is attached to the at least one track; and
at least one cup holder, wherein:
the support shelf has a rearward surface disposed below the storage bin when the storage bin is in the rearward position and a forward surface discontinuous from the rearward surface and disposed below the storage bin when the storage bin is in the forward position; and
the at least one cup holder forms the forward surface of the support shelf.

5. The vehicle door assembly of claim 4 wherein:
the door inner structure defines a storage compartment disposed below the rearward surface of the support shelf; and
the at least one cup holder hides the storage compartment and is configured to be at least one of collapsed and removed from the vehicle door assembly to provide access to the storage compartment.

6. A vehicle door assembly comprising:
a door inner structure including an outer side panel and an armrest, the armrest projecting laterally inward from the outer side panel;
a storage bin disposed below the armrest, attached to the door inner structure, and translatable relative to the door inner structure between a rearward position and a forward position; and
a divider that divides an interior compartment of the storage bin into a front portion and a rear portion, wherein the divider is configure to be at least one of collapsed and removed from the storage bin to provide access to the rear portion of the interior compartment.

7. A vehicle door assembly comprising:
a door inner structure including an outer side panel and an armrest, the armrest projecting laterally inward from the outer side panel; and
a storage bin disposed below the armrest, attached to the door inner structure, and translatable relative to the door inner structure between a rearward position and a forward position, wherein:
a majority of the door inner structure is made of a first material;
the door inner structure includes at least one of a plate and a rib disposed at least one of rearward of the storage bin and laterally inboard of the storage bin; and
the at least one of the plate and the rib is made of a second material that has a greater toughness than the first material.

8. A vehicle door assembly comprising:
a door inner structure including an outer side panel and an armrest, the armrest projecting laterally inward from the outer side panel; and
a storage bin disposed below the armrest, attached to the door inner structure, and translatable relative to the door inner structure between a rearward position and a forward position, wherein:
the storage bin includes a rear panel, a front panel, a side panel, and a plate attached to at least one of the rear panel, the front panel, and the side panel;
the rear panel, the front panel, and the side panel are made from a first material; and
the plate is made from a second material that has a greater toughness than the first material.

9. A vehicle door assembly comprising:
a door inner structure including an outer side panel and an armrest, the armrest projecting laterally inward from the outer side panel; and
a storage bin disposed below the armrest, attached to the door inner structure, and translatable relative to the door inner structure between a rearward position and a forward position, wherein:
the storage bin include a rear panel, a front panel, and a side panel; and
the vehicle door assembly further includes a protrusion that one of (i) projects laterally inward from the door inner structure and into a channel defined by the side panel of the storage bin, and (ii) projects laterally inward from the side panel of the storage bin.

10. A vehicle door assembly comprising:
a door inner structure including an outer side panel and an armrest, the armrest projecting laterally inward from the outer side panel; and a storage bin disposed below the armrest, attached to the door inner structure, and translatable relative to the door inner structure between a rearward position and a forward position, wherein:

the storage bin includes a main body defining an interior compartment and a hinged door that is pivotable relative to the main body from a closed position to an open position to increase the size of an access opening providing access to the interior compartment;

the hinged door pivots from the closed position to the open position due to gravity when the storage bin translates to the forward position; and the hinged door pivots from the open position to the closed position due to engagement with an inner side panel of the door inner structure when the storage bin translates to the rearward position.

11. A vehicle door assembly comprising:

a door inner structure;

at least one track including a guide rail that is fixed to the door inner structure and a slide that is slidable in the guide rail;

a storage bin attached to the slide of the at least one track and translatable relative to the door inner structure between a rearward position and a forward position; and a latch that retains the storage bin in the rearward position and that is releasable to move the storage bin to the forward position.

12. The vehicle door assembly of claim 11 further comprising a handle attached to the storage bin using a hinge and pivotable about the hinge between a latched position and a released position, wherein the handle forms at least part of the latch.

13. The vehicle door assembly of claim 12 wherein:

the handle includes a projection that engages a detent in the door inner structure when the handle is in the latched position; and the latch includes a biasing member that biases the projection on the handle toward the detent in the door inner structure to maintain the handle in the latched position.

14. The vehicle door assembly of claim 11 further comprising an electronic lock that is operable to lock the storage bin in the rearward position in response to an electronic signal.

15. The vehicle door assembly of claim 11 further comprising:

teeth attached to one of the storage bin and the door inner structure;

a lever pivotally attached to the other one of the storage bin and the door inner structure; and one of a ball and a pendulum that moves the lever into engagement with the teeth to prevent the storage bin from translating relative to the door inner structure when a magnitude of vehicle deceleration is greater than a threshold.

* * * * *